United States Patent [19]

Petersen

[11] Patent Number: 5,667,724

[45] Date of Patent: Sep. 16, 1997

[54] PHOSPHOR AND METHOD OF MAKING SAME

[75] Inventor: Ronald O. Petersen, Phoenix, Ariz.

[73] Assignee: Motorola, Schaumburg, Ill.

[21] Appl. No.: 645,406

[22] Filed: May 13, 1996

[51] Int. Cl.⁶ .............. C09K 11/62; C09K 11/54; C09K 11/80
[52] U.S. Cl. .............. 252/301.6 R; 252/301.6 S; 252/301.4 P; 252/301.4 F; 252/301.4 R
[58] Field of Search ............ 252/301.6 R, 301.6 S, 252/301.4 P, 301.4 F, 301.4 R

[56] References Cited

U.S. PATENT DOCUMENTS 4,791,336  12/1988  Morimoto et al. ............ 252/301.6 R Primary Examiner—Melissa Bonner
Attorney, Agent, or Firm—Eugene A. Parsons

[57] ABSTRACT

A phosphor for low voltage applications including a plurality of light-emitting particles being made from a UV-excitable light-emitting phosphor, a diffusion barrier being formed as a film on the light-emitting particles, and a coating of an electron-excitable UV-emitting material being formed on the diffusion barrier. A method for making a low voltage phosphor including the steps of (i) providing a UV-excitable light-emitting phosphor (ii) forming a diffusion barrier on the UV-excitable light-emitting phosphor via sol-gel techniques (iii) forming, via sol-gel techniques, a film of an electron-excitable UV-emitting material on the diffusion barrier.

4 Claims, 2 Drawing Sheets

PHOSPHOR AND METHOD OF MAKING SAME

FIELD OF THE INVENTION

The present invention relates, in general, to the area of luminescent phosphors and more particularly to a low voltage luminescent phosphor for use in a vacuum fluorescent display, or field emission display, and a method for making a phosphor.

BACKGROUND OF THE INVENTION

Vacuum fluorescent displays (VFDs) are well known in the art as emissive, digital display modules, operating at low voltage. One of the drawbacks to the VFD, is the lack of color, and matrix addressability. As a result, the cathode ray tube (CRT) continues to function as the emissive display of choice. However, the CRT needs to operate at high voltage and is not flat. Recently, the Field Emission Display (FED) has been developed as a flat panel vacuum emissive display technology. The goal for a low voltage FED relies on the development of high efficient low voltage phosphors.

Vacuum emissive displays, such as cathode ray tubes, include an electron source which supplies electrons subjected to an acceleration voltage on the order of several ten kilovolts. Typically, these high energy electrons traverse a layer of conductive material disposed on a light-emitting phosphor which is formed on the inner surface of a display faceplate. The electrons thereafter impinge upon the light-emitting phosphor which is thereby excited to emit light. The light-emitting phosphors characteristically have poor electrical conductivity, and any negative charge that accumulates on the surface of the light-emitting phosphor, is bled off by the layer of conductive material. The efficiency with which electrons are transmitted through the charge bleed-off layer, is poor, resulting in at least a 1000 volt drop in electron acceleration potential. This results in lower brightness for the display. The trade-off in brightness between an aluminized phosphor screen, and a non-aluminized screen occurs at about 4000 volts. The efficiency of prior art phosphors at voltages below 4000 volts is marginal. Also, most prior art phosphors do not conduct sufficiently to remove the surface charge build-up. Thus, such a configuration, which includes a charge bleed-off layer, is not practical for use in high brightness VFD's or FED's operating at voltages less than 4000 volts. Much interest exists in developing FED's capable of utilizing electrons having lower energies, on the order of several hundreds to a few thousands of volts.

The use of low energy electrons provides many significant benefits and improvements over the high-energy electron precursors. The most significant is the reduced driver circuit costs of low voltage drivers. This is a significant cost for the final display. Two reasons not to use existing low voltage phosphors are the poor chromaticity for red, blue or green phosphors; and, except for ZnO:Zn, poor efficiency.

Independent of high or low voltage electron acceleration is phosphor degradation. When an electron strikes the phosphor surface, the electrons stimulate a catalytic reaction with adsorbed surface gases and the phosphor itself. The higher the electron current at the phosphor surface, the greater the reaction. The reaction products are released into the vacuum of the display, the species being capable of degrading or poisoning the electron source, such as field emission tips or filaments. Such degradation has obvious deleterious effects on the image quality of the display. In particular, the luminescent materials that are most efficient contain sulfur whose byproducts reacts with cathodes. These sulfur containing phosphors provide the correct color emission to create a CRT-like emissive display. Non-sulfur containing color phosphors are available, but are of poor efficiency when excited by electrons; or, they are of extremely low efficiency making them undesirable choices. Low efficiency phosphors require higher electron current to yield sufficient brightness. High current means more contamination to the emitters, and more heat in the display.

Initially, the development of VFDs and FEDs using low energy electrons was made possible because ZnO:Zn was an available phosphor known to emit light of blue-green color upon excitation with low energy electrons. In contrast to the high voltage phosphors, which have resistivities on the order of $10^6$ to $10^{12}$ ohm.cm, the resistivity of ZnO:Zn phosphor is $10^3$ to $10^4$ ohm.cm. At the lower resistivity, the ZnO:Zn phosphor can conduct away any charge build-up that occurs during excitation. This makes the ZnO:Zn phosphor a good material of choice for low voltage displays. However, because ZnO:Zn was the only known useful phosphor for low energy VFDs, the display color was limited to green.

Because the desire is to reduce power requirement costs, there has been an increasing demand for low energy VFDs and FEDs which provide images having multiple colors. Several approaches have been taken to provide phosphors which emit a variety of colors upon excitation by low energy electrons. In one approach, a phosphor having a lowered resistivity is provided by adding an electrically conductive material, such as indium oxide, to a high-resistance, color-emitting phosphor. This approach reduces resistivity to about $10^4$ to $10^7$ ohm.cm. The luminance of these lowered-resistance phosphors is only 15 to 45 per cent that of the ZnO:Zn phosphor being exposed to the same voltage conditions.

Another prior art scheme for providing color phosphors for low energy VFDs includes providing a $ZnO.Ga_2O_3$:Cd, or cadmium-doped zinc gallate material, which is physically mixed with a powder form of a high-resistance, color-emitting phosphor, that is excited very efficiently by ultra violet rays (UV). There are many known lamp phosphors that emit the proper color and are efficient when excited with UV. Because the gallate matrix is electrically conductive, the mixture does not charge up under electron excitation. Because the cadmium doped zinc gallate efficiently emits ultraviolet (UV) radiation upon excitation by electrons, the UV excitable phosphor emits with the correct color of visible light. The gallate-containing phosphor still does not exhibit the luminance of the constituent high-resistance, color-emitting phosphor when excited by high-energy electrons. The cadmium-doped zinc gallate material occupies volume in the final phosphor while not providing visible luminance, thereby providing reduced efficiency.

As will be described in greater detail below, the cadmium-doped zinc gallate material must be formed prior to combination with the high-resistance, light-emitting phosphor, because this prior art process requires treatments at temperatures upwards of 1300° C. Many of the known high-resistance, light-emitting phosphors cannot withstand such high temperatures without chemically reacting with the UV emitting phosphor to form a new low emissive compound, or without decomposing to form a new low emissive compound. Thus, formation of the UV-emitting material cannot be carried out in the presence of the high-resistance, light-emitting phosphor.

In summary, admixing of a UV emitting phosphor with UV excitable phosphor is no more acceptable than admixing a high resistance phosphor with a conductive material like indium oxide. To reiterate, the functional relationship between the UV-emitting material and the light-emitting phosphor, they must be admixed together physically in the form of powders. In such a manner, particles of the UV-emitting material are dispersed between particles of the light-emitting material. The drawbacks of this physical configuration include reduced brightness and poor electrical conductivity because the particles of the cadmium-doped zinc gallate material, while having higher electrical conductivities than the light-emitting phosphor, are separated from one another by the particles of the light-emitting phosphor, which have poor electrical conductivities.

As mentioned above, the UV-emitting phosphor is included because, for many prior art phosphors, UV excitation provides more efficient light emission than electron excitation. Many prior art phosphors have a 90–100% quantum efficiency; that is, for each photon of UV radiation that excites the light-emitting phosphor, one photon of visible light radiation is emitted by the light-emitting phosphor. In contrast, electron excitation of these phosphors exhibits an efficiency between 1–20%. A 1% electron excitation efficiency means that for every 100 electrons received by the light-emitting phosphor, only one photon of visible light is produced.

The above prior art method of providing a low voltage phosphor by combining a UV-emitting material with a UV-excitable, light-emitting prior art phosphor suffers several drawbacks. When the low voltage phosphor is provided by mixing the UV-emitting material with the UV-excitable, light-emitting phosphor, not all of the electrons received by the mixture are converted to UV rays, resulting in the low efficiency emission referred to above.

Accordingly, there exists a need for a new and improved phosphor having improved efficiency and luminance under low energy electron conditions. There also exits a need for a new and improved phosphor which reduces the deleterious effects of outgassing which results in poisoning of the cathode.

The method for making the prior art gallate phosphor described above includes, first, mixing ZnO, $Ga_2O_3$, $CdCO_3$, and, in some instances, a rare earth being selected from the group consisting of Ce, Pr, Nd, Sm, Eu, Tb, Dy, Ho, Er, and Tm, in appropriate amounts. The rare earth element, if included, emits a characteristic colored light, thereby providing the color-emitting function of the resulting phosphor. The prior art discloses the use of rare earth elements in low voltage phosphors solely for providing colored light; the Cd was found to enhance the UV emission of the zinc gallate phosphor. This mixture is then heated in an air atmosphere, to temperatures of about 1000°–1300° C. for about 5 hours. The rare-earth-containing phosphors resulting from this prior art method, however, have poor luminescence. If a rare earth is not included in the above mixing step, the UV emitter thereby produced is physically mixed with a color-emitting high-resistance phosphor to provide the prior art low voltage phosphor. Because many prior art phosphors are adversely affected by high temperature treatments, and because this method of making the UV-emitting substance includes firing at temperatures well above the temperature tolerances of many color-emitting phosphors, the UV-emitting substance cannot be formed onto the particles of the color-emitting phosphor via this prior art method. Rather, the UV-emitting, electron-excitable material must be formed in a separate step and thereafter physically mixed into the color-emitting phosphor, a process which limits the efficiency of the low voltage phosphor resulting therefrom.

Accordingly, there exists a need for an improved method for making a phosphor which can be performed at temperatures beneath the temperature tolerances of prior art, color-emitting phosphors.

Sol-gel technology, whereby a solution or "sol" becomes dense like a glass, is known in the art and includes methods for the formation of coatings, or thin films, on glass, ceramic, glass or ceramic fibers, and specialty shapes. Sol-gel processes include a myriad of chemistries, but have similar constituent steps, including gelation by, for example, hydrolysis of metal-organics in solution to provide a gel, drying of the gel, pyrolysis, and densification which results in crystallization of the material. Sol-gel techniques are favored for their low-temperature treatments. These temperatures (about 300°–1000° C.) are beneath the tolerance temperatures of most substrates used for display face plates, and beneath the tolerance temperatures of most light-emitting, high-resistivity phosphors.

BRIEF DESCRIPTION OF THE DRAWINGS

Referring to the drawings.

DESCRIPTION OF THE PREFERRED EMBODIMENTS

Figure 1:
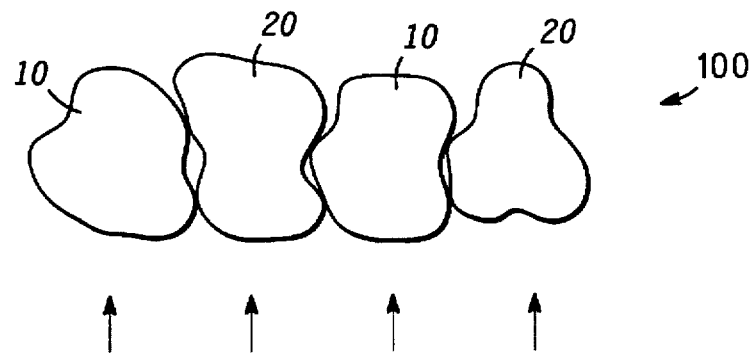
FIG. 1 is a schematic representation of a prior art low voltage phosphor.

Referring now to FIG. 1 there is depicted a schematic representation of a prior art phosphor 100. Phosphor 100 is designed to emit radiation in the visible range when excited by low energy (in the tens of volts) electrons. Phosphor 100 includes a mixture of a plurality of light-emitting particles 10 and a plurality of UV-emitting particles 20. Light-emitting particles 10 are made of a well-known UV-excitable light-emitting phosphor, which is known to emit colored light upon UV excitation. Many such UV-excitable light-emitting phosphors exist, such as, for the emission of blue light: $(SrCaBaMg)_5(PO_4)_3Cl:Eu$, $Sr_5Cl(PO_4)_3:Eu$, and $BaMg_2Al_{16}O_{27}:Eu$; for the emission of green light: $(La,Ca,Tb)PO_4:Ce:Tb$, $(Ce,Tb)MgAl_{11}O_{19}:Ce:Tb$ and $Zn_2SiO_4:Mn$; and, for the emission of red light: $Y_2O_3:Eu$, $Mg_4(F)GeO_6:Mn$. In addition, ZnS:Cu,Al (green light emitter), ZnS:Zn (blue light emitter), $(Zn_{0.2}Cd_{0.8})S:Ag,Cl$ (red light emitter), and other somewhat conductive electron-excitable phosphors can be excited by UV. UV-emitting particles 20 are made of a cadmium-doped gallate material having the chemical formula $ZnO.Ga_2O_3:Cd$. Other UV-emitting phosphors found in the prior art include materials like: $BaSi_2O_5:Pb$, $SrB_4O_7:Eu$, $Ce(BA,Mg)Al_{11}O_{19}:Ce$, $Y_2O_3:Gd$, $LaPO_4:Ce$, and $LaAlO_3:Ce$. However, these materials are not electrically conductive, whereas the $ZnO.Ga_2O_3:Cd$ is electrically conductive. UV-emitting particles 20, which are made from the $ZnO.Ga_2O_3:Cd$ material, are randomly interspersed between light-emitting particles 10. The arrows in FIG. 1 represent the direction of flow of electrons from a filament (not shown). The electrons are received by particles 10,20. The efficiency of conversion, as described in detail above, of electrons to light from light-emitting particles 10, is poor, while the efficiencies of conversion of electrons to UV radiation from the UV-emitting particles 20, and of UV radiation to light from light-emitting particles 10, are good. Since a fraction of the electrons are received by low efficiency, light-emitting particles 10, it is evident that electrons are not being efficiently converted to light by prior art phosphor 100. Additionally, although UV-emitting particles 20 provide enhanced electrical conductivities over light-emitting particles 10, UV-emitting particles 20 are separated by light-emitting particles 10, so that the electrical conduction paths pass through light-emitting particles 10, resulting in slowed conduction through prior art phosphor 100. The slow transport of electrons out of phosphor 100 may result in the formation of a negative electrical charge at the surfaces of light-emitting particles 10, which further reduces efficiency of phosphor 100 by providing electron repulsion at the outer surfaces of light-emitting particles 10.

Figure 2:
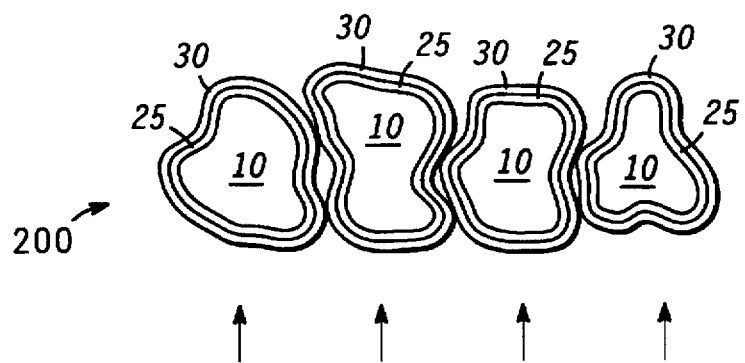
FIG. 2 is a cross-sectional view of a schematic representation of an embodiment of a phosphor in accordance with the present invention.

Referring now to FIG. 2, there is depicted a cross-sectional view of a schematic representation of a preferred embodiment of a phosphor 200 for a low voltage VFD or FED in accordance with the present invention. Phosphor 200 includes light-emitting particles 10 having outer surfaces. Light-emitting particles 10 can be obtained in a powder form from manufacturers of UV-excitable light-emitting phosphors, such as OSRAM, Sylvania, General Electric, Toshiba, Nichia, Philips, and Kasei. Such phosphors, some of which are identified above with reference to FIG. 1, are generally not suitable for electron-beam excitation; they are designed to have a photo absorption band in the UV range. In the preferred embodiment, a diffusion barrier 25 is formed on the outer surfaces of light-emitting particles 10. Diffusion barriers 25 are made of a UV-transmitting, chemically inert material, such as silica. The method of formation of diffusion barriers 25 includes sol-gel techniques and is described in detail below. A coating 30 is disposed on the outer surfaces of diffusion barriers 25. Coatings 30 include an electron-excitable, UV-emitting material having good electron-to-UV conversion efficiency and having good thermal and electrical conductivities. Coatings 30 emit UV radiation upon excitation by electrons. The arrows illustrated in FIG. 2 represent the flow of electrons from an electron source (not shown) toward phosphor 200. It will be noted that the electrons are received by coatings 30, which have a good electron-to-UV conversion efficiency (being subsequently followed by the high UV-to-light conversion efficiency of light-emitting particles 10), and not by the outer surfaces of light-emitting particles 10, which have a low electron-to-light conversion efficiency. In this manner, phosphor 200 provides an improved overall electron-to-visible light conversion efficiency and, thereby, an improved luminous efficiency of proper red, green and blue chromaticities. Additionally, phosphor 200 provides continuous paths for electrical conduction through phosphor 200. These continuous paths are disposed within coatings 30 which have high electrical conductivities and which have points of physical contact between adjacent light-emitting particles 10. This configuration precludes the formation of a negative electrical charge at the electron-receiving surfaces, thereby further enhancing the luminous efficiency of phosphor 200. In a preferred embodiment of a method for making a phosphor in accordance with the present invention, coatings 30 include an electron-excitable UV-emitting material being formed via sol-gel techniques, which are well known in the art. Many compositions having the properties of UV emission and favorable electrical conductivity can be made using sol-gel techniques. In the preferred embodiment of the present invention, the electron-excitable UV-emitting material comprising coatings 30 includes a material having the chemical formula $ZnO.Ga_2O_3$:Gd. The zinc oxide and gallate form a matrix within which gadolinium exists as a dopant. The zinc gallate provides favorable electrical conductivity; the gadolinium, a rare earth element, is the UV-emitting constituent which provides enhanced UV emission. This electron-excitable UV-emitting material is formed on the outer surfaces of diffusion barriers 25 during a sol-gel process for making the $ZnO.Ga_2O_3$:Gd, in accordance with the present invention. In other embodiments of a phosphor and a method for making a phosphor, a film of the electron-excitable UV-emitting material is disposed in an operable spaced relationship to a layer of the UV-excitable light-emitting phosphor, so that the UV-excitable light-emitting phosphor is positioned to receive UV radiation emitted by the electron-excitable UV-emitting material, and the electron-excitable UV-emitting material is formed via sol-gel techniques. In the preferred embodiment of a method for making a phosphor in accordance with the present invention, the $ZnO.Ga_2O_3$:Gd is formed on the UV-excitable light-emitting phosphor by first providing the proper proportions of the salts of the elements Zn, Ga, and Gd, the anions of which include, for example, nitrates, carbonates, citrates, alkoxides, or acetates. It is believed that the molar ratios of $Ga_2O_3$ to ZnO to Gd are about $1:(0.5-4):(5\times10^{-4}-0.3)$. Next, the salts are dissolved in water to provide a first solution, having metal salt concentrations are on the order of 10 grams per liter. Then, glycine and a 2:1 mixture of urea and carbohydrazide ($CH_6N_4O$) are added to the first solution to provide a final solution. The final solution is gently heated thereby reducing the water content and increasing the viscosity to provide a viscous solution. The value of the viscosity of the viscous solution is determined by the subsequent film formation technique, which can include, for example, spin casting, dipping, vapor-phase deposition, or spray drying. In the preferred embodiment, the step of forming on the UV-excitable light-emitting phosphor a film of the viscous solution, includes adding light-emitting particles 10 to the viscous solution to provide an admixed solution. Thereafter, the admixed solution is spray dried or processed in a fluidized bed to provide light-emitting particles 10 having coatings 30 thereon. The thickness of coatings 30 is less than or equal to one micrometer; the characteristic dimension of light-emitting particles 10 is in the range of about 3–10 micrometers. The coated particles are then heated in an oven to a temperature in the range of 300–1000 degrees Celsius for an adequate period of time to achieve the crystallization and activation of coatings 30. The heating time is believed to be much less than the 5 hour heating treatments of the prior art, and may be as little as five minutes. The organic complexiants of the applied viscous solution form a molecular glass with the metals. During the heating process, at 200 degrees Celsius, the salts and complexiants are oxidized thereby leaving the pure metals in an amorphous homogeneous film. Further heating at the higher temperatures causes crystallization and activation of the film. The temperatures are maintained below the temperature limits of UV-excitable light-emitting phosphor comprising particles 10. The thickness of coatings 30 can be increased by performing successive film treatments. Thereafter, light-emitting particles 10 having coatings 30 are deposited onto a display face plate by utilizing one of several powder deposition technologies commonly found in the television industry, such as slurry deposition, dusting, and the like. Diffusion barriers 25 are formed from a viscous solution containing ethyl silicate, water, glycine, urea and carbohydrazide, which is prepared in the same manner as the viscous solution for coatings 30. The ethyl silicate solution is applied to the outer surfaces of light-emitting particles 10, prior to the formation of coatings 30, and then heat treated to a temperature within the range of 300–1000 degrees Celsius for a period of time sufficient to crystallize the film, thereby forming diffusion barriers 25. The fabrication of barrier layers is a well known sol-gel technology, and other starting materials can be used to create diffusion barriers 25. Diffusion barriers 25 prevent diffusion of species between light-emitting particles 10 and coatings 30, which may thereby alter the properties of light-emitting particles 10 and/or coatings 30. Diffusion barriers 25 also prevent the reaction of species at the interface between light-emitting particles 10 and coatings 30. These reactions may result in products having unfavorable properties, such as poor UV transmittance. In some applications, the nature of the chemistry may be such that, and the values of the processing temperatures during the formation of coatings 30 may be low enough that, no appreciable diffusion or reaction occurs between light-emitting particles 10 and coatings 30, or the products of an interfacial reaction do not alter the desired functioning of phosphor 200. The embodiments of the present invention for these applications need not include diffusion barriers 25. In the preferred embodiment of the present invention, diffusion barriers 25 are formed via sol-gel techniques onto the outer surfaces of light-emitting particles 10, and, thereafter, coatings 30 are formed via sol-gel techniques onto the outer surfaces of diffusion barriers 25.

In other embodiments of an electron-excitable UV-emitting material in accordance with the present invention, the $ZnO.Ga_2O_3$:Gd can be fabricated via traditional solid state reactions by heat treating a mixture of, for example, ZnO, $Ga_2O_3$, and $Gd_2O_3$, or other suitable precursors. Alternatively, $ZnO.Ga_2O_3$:Gd can be fabricated via sol-gel techniques and then converted into powder form. It is believed that a powder formed from a sol-gel product has improved purity over powders formed via prior art solid state techniques since lower oven temperatures provide fewer contaminants being released from furnaces walls. The $ZnO.Ga_2O_3$:Gd powder thereby produced can subsequently be physically mixed with a UV-excitable light-emitting phosphor powder to provide a low voltage phosphor in accordance with the present invention. In other embodiments of the present invention, cadmium is also added as a dopant to provide a material with the chemical formula $ZnO-Ga_2O_3$:Cd, Gd. It is believed that the molar ratios of $Ga_2O_3$ to ZnO to (Cd,Gd) are about $1:(0.5-4.0):(5\times10^{-4}-0.3)$. Fabrication techniques are equivalent to those described above with reference to the $ZnO.Ga_2O_3$:Gd material, wherein $CdCO_3$ is included with the reaction mixture as a source of Cd.

Figure 3:
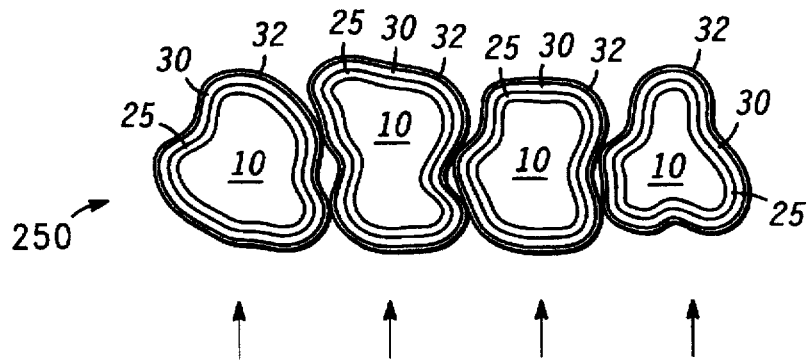
FIG. 3 is a cross-sectional view of a schematic representation of another embodiment of a phosphor in accordance with the present invention.

Referring now to FIG. 3, there is depicted a cross-sectional view of a schematic representation of another embodiment of a phosphor 250 in accordance with the present invention. Phosphor 250 includes the elements of phosphor 200 of FIG. 2 and further includes thin conductive coatings 32, which are formed on coatings 30. It will be appreciated from the discussion with reference to FIG. 2, that any material which is excitable by electrons to emit UV, and which can be applied as a coating, can be used to form coatings 30 on the UV-excitable light-emitting phosphor. If such an electron-excitable UV-emitting material does not provide sufficient electrical conductivity for charge bleed-off, thin conductive coatings 32 are formed so that the surfaces of the particles of phosphor 250 are electrically conductive. Thin conductive coatings 32 must be very thin so that appreciable electron loss does not occur when the electrons traverse thin conductive coatings 32. Thus, the thickness of thin conductive coatings 32 is within a range of 100–500 angstroms. Thin conductive coatings 32 include a conductive substance, such as manganese metal or manganese oxide, which enhances electrical conductivity of phosphor 250. Other transition metals or metals from Groups III, IV, or V of the Periodic Table, or oxides thereof, can be used. Such metals include vanadium, chromium, nickel, zinc, gold, silver, tungsten, tantalum, titanium, molybdenum, cobalt, iron, gallium, indium, tin, bismuth, and antimony. An additional feature of thin conductive coatings 32 is that the constituent conductive substance must not diffuse into the electron-excitable UV-emitting material of coatings 30. By utilizing the low-temperature sol-gel techniques described with reference to FIG. 2, thin conductive coatings 32 can be formed on coatings 30 so that the conductive substance does not diffuse into coatings 30. A salt of the conductive substance, such as manganese metal, is dissolved in water to provide a first solution, having a metal salt concentration are on the order of 10 grams per liter. Then, glycine and a 2:1 mixture of urea and carbohydrazide ($CH_6N_4O$) are added to the first solution to provide a final solution. The final solution is gently heated thereby reducing the water content and increasing the viscosity to provide a viscous solution. The value of the viscosity of the viscous solution is determined by the subsequent film formation technique. A film of the viscous solution is formed on coatings 30 and, thereafter, heat treated to temperatures in a range of 300°–1000° C. to crystallize thin conductive coatings 32. When electrons are received by phosphor 250, they traverse thin conductive coatings 32, and then cause light to be emitted in a manner described with reference to FIG. 2. Electrons are then bled out of phosphor 250 via electronic conduction paths through thin conductive coatings 32. In another embodiment of a phosphor in accordance with the present invention, thin conductive coatings 32 are formed on coatings 30, which are formed on light-emitting particles 10, so that no diffusion barrier is included. In yet another embodiment of a phosphor in accordance with the present invention, the phosphor includes all elements of phosphor 250, except coatings 30. Additionally, in this particular embodiment, the thin conductive coatings further include an electron-excitable UV-emitting substance, such as $ZnO.Ga_2O_3$:Gd. The precursors of the electron-excitable UV-emitting substance are added to the precursor sol-gel viscous solution, which is prepared in the manner described in the description of thin conductive coatings 32 with reference to FIG. 3. In this particular embodiment, the crystallization of the thin conductive coatings is performed so that the resulting crystallites have a characteristic dimension of less than 70 angstroms, preferably less than 40 angstroms. These doped nanocrystallites have one activator of the electron-excitable UV-emitting substance per unit cell. The utilization of such small nanocrystallites allows the formation of very thin films which also provides sufficient concentration of the electron-excitable UV-emitting material so that excitation efficiency is high and electron-hole recombination is extremely rapid. The techniques for controlling the size of nanocrystallites within a holding medium of a sol-gel structure are known to one skilled in the art of organo-metallic, sol-gel chemistry. In this particular embodiment, the holding medium is the conductive substance, such as tin oxide or indium oxide, of the thin conductive coatings. The thickness of the thin conductive coatings of this particular embodiment are also within a range of 100–500 angstroms, for the reasons stated above in the description of phosphor 250.

Figure 4:
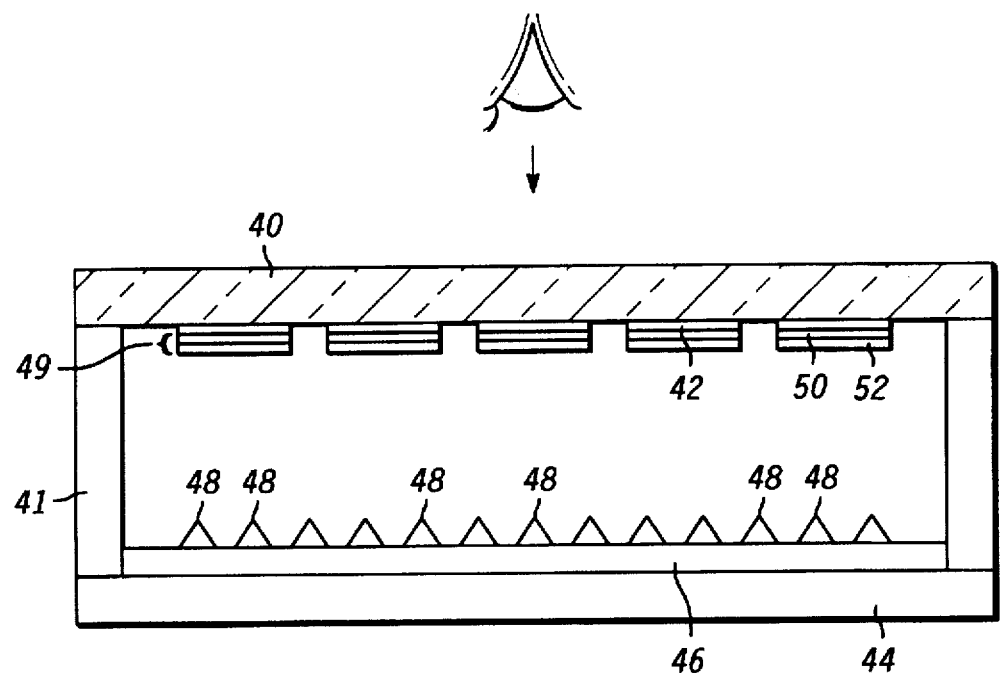
FIG. 4 is a side elevational view of an embodiment of a field emission display in accordance with the present invention.

Referring now to FIG. 4, there is depicted a side elevational view of an embodiment of a field emission display (FED) 300 in accordance with the present invention. FED 300 includes a back plate 44, a plurality of side plates 41, and a face plate 40, which define an interspace region. Within the interspace region, and on back plate 44, is disposed an electron source 46, which, in the preferred embodiment, is a cold cathode field emitter including a plurality of field emission devices 48. Field emission devices and field emission displays are known to one skilled in the art. Field emission devices 48 include Spindt tip emitters or one of other cold cathode structures, such as diamond emitters, diamond-like carbon emitters, and the like. Diamond and diamond-like carbon are materials which exhibit favorable electron emission properties at low voltages, a characteristic which is believed to be attributable to the low work functions of the materials. The formation of the electric field and the required electronics will be known to one skilled in the art. Disposed on the inner surface of face plate 40, are a plurality of anode conductors 42, which are made from a transparent, conductive material, such as indium tin oxide, and are deposited on face plate 40 by any of a number of deposition techniques known in the art. A phosphor 49 is disposed on anode conductors 42. In the embodiment of FIG. 4, phosphor 49 includes a layer 50 of a UV-excitable light-emitting phosphor and a layer 52 of an electron-excitable UV-emitting material formed thereon. In another embodiment of a phosphor in accordance with the present invention, phosphor 49 includes a layer of phosphor 200 as described with reference to FIG. 2, and which would be deposited onto anode conductors 42 using well-known techniques such as slurry deposition, dusting, and the like. In the embodiment of FIG. 4, the color-emissive phosphor having high electrical resistance, is deposited as a separate layer, layer 50, upon which a film, layer 52, of an electron-excitable UV-emitting material is formed via sol-gel techniques. In a preferred embodiment of a method for fabricating a FED in accordance with the present invention, layer 50 includes any of a number of light-emitting phosphors, some of which are listed with reference to FIG. 1 in the description of the UV-excitable light-emitting phosphors which comprise light-emitting particles 10. Well known in the art are UV-excitable light-emitting phosphors which are available in powdered form. Other forms of light-emitting phosphors can be used. For example, well known light-emitting phosphor compositions can be formed via sol-gel techniques by providing the salts of the appropriate metals and other required species, preparing a viscous solution (in the manner described with reference to FIG. 2 for the formation of coatings 30), thereafter applying on anode conductors 42 a film of the viscous solution, and thereafter heat treating the film, thereby providing layer 50. In the preferred embodiment of a method for fabricating a FED in accordance with the present invention, layer 50 includes a powder UV-excitable, light-emitting phosphor, which is deposited in the form of strips onto anode conductors 42 by using deposition techniques that are well known in the art, such as traditional photo-deposition technology, electrophoretic deposition technology, and the like. Layer 52 includes an electron-excitable, UV-emitting material having the same composition as, and having a precursor viscous solution prepared in the same manner as for, coatings 30 as described with reference to FIG. 2. The viscous solution thus prepared is applied as a film onto layer 50 by one of several liquid film deposition methods, such as spin-casting, spraying, vapor-phase deposition, dipping, and the like. Dipping is well known to one skilled in the art of sol-gel techniques, and includes dipping face plate 40, having anode conductors 42 and layer 50 disposed thereon, into the sol-gel viscous solution precursor of the electron-excitable UV-emitting material, and thereafter withdrawing face plate 40 while controlling conditions, such as rate of removal and the angle between face plate 40 and the liquid surface of the sol-gel viscous solution, which determine the thickness of the film deposited thereby. To complete the formation of the electron-excitable UV-emitting material, the applied film of the viscous solution requires further heat treatment to crystallize and activate the material. So, face plate 40 having layers 50, 52 deposited thereon, is heated treated in an oven to temperatures in the range of 300°–1000° C. Most of the face plate materials, including glasses, commonly used in the display industry have temperature tolerances upwards of 700° C. So, the temperatures during the heat treatment are maintained below the tolerances of the material comprising face plate 40. The film is thereby crystallized and activated to complete the formation of the electron-excitable UV-emitting material. In another embodiment of the present invention, prior to the formation of layer 52, layer 50 is coated with a diffusion barrier layer via sol-gel and liquid film deposition techniques. The sol-gel viscous solution for such a diffusion barrier layer is provided in the same manner as described with reference to FIG. 2 for the formation of diffusion barriers 25; the deposition techniques of such a diffusion barrier layer are the same as those used for the deposition of layer 52. Subsequently, layer 52 is formed on the diffusion barrier layer. The diffusion barrier layer prevents diffusion of, and reaction between, chemical species at the interface between layer 50 and layer 52. In another embodiment of the present invention, phosphor 49 is formed by, first, preparing the sol-gel precursor viscous solution for the electron-excitable UV-emitting material; then the light-emitting phosphor powder, having a diffusion barrier layer already formed on the constituent phosphor particles, is added to the sol-gel viscous solution to provide a dipping solution having an appropriate concentration of the light-emitting phosphor to provide the necessary luminescence. Thereafter, face plate 40, having anode conductors 42 disposed thereon, is dipped into, and then removed from, the dipping solution, thereby forming a film of the dipping solution on anode conductors 42. Thereafter, face plate 40 is heat treated in an oven to a temperature of about 300–1000 degrees Celsius, maintained below the temperature tolerances of face plate 40 and of the light-emitting phosphor, thereby crystallizing and activating the film material to provide the electron-excitable UV-emitting material and to provide phosphor 49. Methods for fabricating electron sources are known in the art. In the preferred embodiment, FED 300 includes field emission devices 48 including, for example, Spindt tips, which are known in the art. When the appropriate electric field is formed at field emission devices 48, low energy electrons are emitted. The electrons traverse the interspace region and are received by layer 52 which is thereby excited to emit UV radiation. The UV radiation is received by the light-emitting phosphor of layer 50 which is thereby excited to emit visible light having a predetermined wavelength, or color, which is determined by the identity of the light-emitting phosphor. The light travels through the transparent material comprising anode conductors 42 and through the transparent material comprising face plate 40. Because the electron-excitable UV-emitting material has been applied as a film, extra bonding occurs heat sinking with faceplate 40, reducing the thermal quenching and aging of phosphor 49. In addition, layer 52 is somewhat conductive so that electrical charge build-up in phosphor 49 is reduced during operation of FED 300.

In another embodiment of a display in accordance with the present invention, field emission devices 48 are omitted and the electron source includes a filamentary cathode, thereby providing a VFD. Filamentary cathodes are known to one skilled in the art, and can be made by applying the carbonates of barium, strontium, and calcium onto ultrafine pure tungsten wire, and heating the wire by passing a current therethrough immediately before completion of the evacuation of the interspace region, thereby forming on the wire the oxides of the three alkaline earth metals and providing an electron source.

Figure 5:
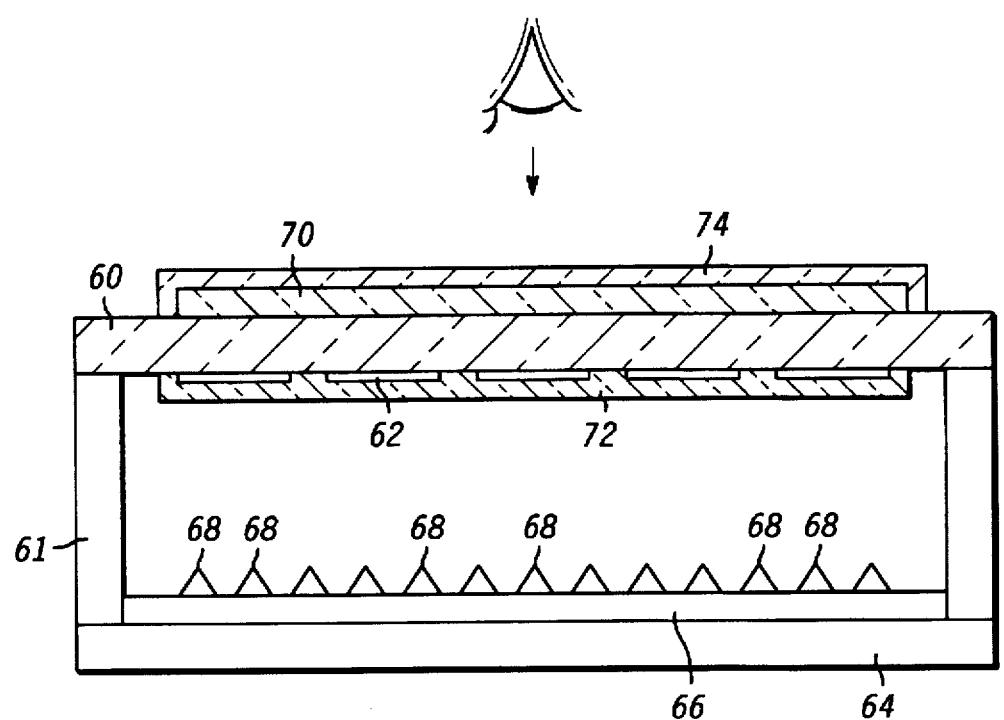
FIG. 5 is a side elevational view of another embodiment of a field emission display in accordance with the present invention.

Referring now to FIG. 5, there is depicted a side elevational view of another embodiment of a FED 400 in accordance with the present invention. FED 400 includes a back plate 64, a plurality of side plates 61, and a face plate 60, which define an interspace region. Face plate 60 is made from a transparent UV-transmitting material, such as glass. To lessen the scattering of light, face plate 60 can be made from a directional material such as a fiber optic. Within the interspace region, and on back plate 64, is disposed an electron source 66, which, in this embodiment, includes a cold cathode field emitter having a plurality of field emission devices 68. Disposed on the inner surface of face plate 60, are a plurality of anode conductors 62, which are made from a transparent, conductive material and are deposited on face plate 60 by any of a number of deposition techniques known in the art. A layer 72 of electron excitable UV-emitting material is disposed on anode conductors 62. This configuration allows layer 72 to function also as a thermal heat sink with face plate 60. FEDs are driven at current densities which generate appreciable heat within their phosphors; low heat dissipation out of the phosphor can have adverse effects on phosphor performance. Thus, this configuration is beneficial since it enhances the conduction of heat away from layer 72. Layer 72 is formed by sol-gel techniques and liquid film deposition methods, as described with reference to FIG. 4 and the description of layer 52. In this embodiment of a FED in accordance with the present invention, layer 72 is spaced from a layer 70, which includes a UV-excitable light-emitting phosphor. A list of such phosphors is set forth with reference to FIG. 1, in the description of light-emitting particles 10. In other embodiments, layer 70 is fabricated via sol-gel techniques. Layer 70 is formed on the outer surface of face plate 60 and is enclosed by a protective film 74, such as a silica barrier layer, which protects the light-emitting phosphor from exposure to moisture in the air. In this particular embodiment, layer 72 includes $ZnO.Ga_2O_3$:Gd formed by sol-gel techniques as described with reference to FIG. 2 and deposited as a film by any of several liquid film deposition techniques, such as spin-casting, dipping, vapor phase deposition, and the like. In this embodiment, electrons emitted by electron source 66 are received by layer 72 which is thereby excited to emit UV radiation, which, in turn, travels through transparent anode conductors 62 and transparent face plate 60 to be received by layer 70 which is thereby excited to emit visible light having a predetermined color. A sol-gel layer, such as layer 72 of FED 400, also provides improved mechanical ruggedness over prior art powdered phosphors which are adhered to the inner surface of a face plate of a display. This improved mechanical stability is desirable when mechanical standoff structures, or spacers, are incorporated between the face plate and back plate of a display, so that minor mechanical disturbances during the placement and fixation of such spacers do not remove, or otherwise adversely affect the patterning of, the phosphor. Because layer 70 is disposed on the outer surface of face plate 60, the UV-excitable light-emitting phosphor can be deposited subsequent to the high-temperature, packaging steps included in the fabrication of FED 400, so that UV-excitable light-emitting phosphors having low temperature tolerances are employable. The configuration also allows the use of organic UV-excitable light-emitting phosphors in layer 70. In general, it is not desirable to employ organic materials within the evacuated, interspace region of a FED because the organic materials outgas upon electron excitation. However, this outgassing problem is precluded by providing such an organic layer which is not in contact with the evacuated interspace region. Layer 70 can be deposited using any of various deposition schemes, including silk-screening, ink-jet, off-set printing, transfer tape, and the like.

In summary, a phosphor, in accordance with the present invention, has been described which provides enhanced luminous efficiency under low voltage electron conditions.

What is claimed is:

1. An electron-excitable UV-emitting material having a general formula $ZnO.Ga_2O_3$:Gd having molar ratios of $Ga_2O_3$ to ZnO to Gd within the ranges of 1:(0.5–4):(5×10$^{-4}$–0.3), respectively, whereby the electron-excitable UV-emitting material emits ultraviolet radiation upon electron exaltation.

2. An electron-excitable UV-emitting material having a general formula $ZnO.Ga_2O_3$:Cd,Gd having molar ratios of $Ga_2O_3$ to ZnO to (Cd, Gd) within the ranges of 1:(0.5–4):(5×10$^{-4}$–0.3), respectively, whereby the electron-excitable UV-emitting material emits ultraviolet radiation upon electron exaltation.

3. A phosphor including a mixture of:

an electron-excitable UV-emitting material having a general formula $ZnO.Ga_2O_3$:Gd having molar ratios of $Ga_2O_3$ to ZnO to Gd within the ranges of 1:(0.5–4):(5×10$^{-4}$–0.3), respectively; and a UV-excitable light-emitting phosphor whereby the electron-excitable UV-emitting material emits UV radiation upon electron excitation, the UV radiation being received by the UV-excitable light-emitting phosphor to provide visible light having a predetermined color.

4. A phosphor including a mixture of:

an electron-excitable UV-emitting material having a general formula $ZnO.Ga_2O_3$:Cd,Gd having molar ratios of $Ga_2O_3$ to ZnO to (Cd, Gd) within the ranges of 1:(0.5–4):(5×10$^{-4}$–0.3), respectively; and a UV-excitable light-emitting phosphor whereby the electron-excitable UV-emitting material emits UV radiation upon electron excitation, the UV radiation being received by the UV-excitable light-emitting phosphor to provide light.

* * * * *

UNITED STATES PATENT AND TRADEMARK OFFICE
CERTIFICATE OF CORRECTION

PATENT NO. : 5,667,724
DATED : September 16, 1997
INVENTOR(S) : Ronald O. Peterson It is certified that error appears in the above-indentified patent and that said Letters Patent is hereby corrected as shown below:

In Claim 1, column 12, line 33, delete "exaltation", insert --excitation--.

In Claim 2, column 12, line 39, delete "exaltation", insert --excitation--.

Signed and Sealed this

Second Day of December, 1997

Attest:

BRUCE LEHMAN

Attesting Officer

Commissioner of Patents and Trademarks